(12) United States Patent
Triguel

(10) Patent No.: US 11,554,609 B2
(45) Date of Patent: Jan. 17, 2023

(54) TIRE WITH AN OUTER SIDEWALL COMPOSED OF AT LEAST A DIENE ELASTOMER AND WAX MIXTURE

(71) Applicant: COMPAGNIE GENERALE DES ETABLISSEMENTS MICHELIN, Clermont-Ferrand (FR)

(72) Inventor: Aurélie Triguel, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 296 days.

(21) Appl. No.: 16/461,603

(22) PCT Filed: Nov. 17, 2017

(86) PCT No.: PCT/FR2017/053149
§ 371 (c)(1),
(2) Date: May 16, 2019

(87) PCT Pub. No.: WO2018/091841
PCT Pub. Date: May 24, 2018

(65) Prior Publication Data
US 2020/0062035 A1   Feb. 27, 2020

(30) Foreign Application Priority Data

Nov. 18, 2016 (FR) ...................... 1661210

(51) Int. Cl.
| | |
|---|---|
| B60C 1/00 | (2006.01) |
| C08K 3/013 | (2018.01) |
| C08F 36/06 | (2006.01) |
| C08F 36/08 | (2006.01) |
| C08K 3/04 | (2006.01) |
| C08K 3/36 | (2006.01) |
| C08K 5/00 | (2006.01) |
| C08K 5/01 | (2006.01) |
| C08L 7/00 | (2006.01) |
| C08L 91/00 | (2006.01) |
| C08L 91/06 | (2006.01) |
| C08L 9/00 | (2006.01) |

(52) U.S. Cl.
CPC ............ B60C 1/0025 (2013.01); C08F 36/06 (2013.01); C08F 36/08 (2013.01); C08K 3/013 (2018.01); C08K 3/04 (2013.01); C08K 3/36 (2013.01); C08K 5/0016 (2013.01); C08K 5/0025 (2013.01); C08K 5/01 (2013.01); C08L 7/00 (2013.01); C08L 9/00 (2013.01); C08L 91/00 (2013.01); C08L 91/06 (2013.01); C08L 2312/00 (2013.01)

(58) Field of Classification Search
CPC .... C08L 7/00; C08L 9/00; C08L 91/00; C08L 91/06; C08L 2312/00; C08K 5/0016; C08K 3/013; C08K 3/04; C08K 5/0025; C08K 5/01; C08K 3/36; C08K 5/3437; C08K 5/18; C08K 5/09; C08K 3/22; C08K 5/47; C08K 3/06; B60C 1/0025; C08F 36/08; C08F 36/06
See application file for complete search history.

(56) References Cited

U.S. PATENT DOCUMENTS

| | | |
|---|---|---|
| 3,464,477 A | 9/1969 | Verdier |
| 5,977,238 A | 11/1999 | Labauze |
| 6,013,718 A | 1/2000 | Cabioch et al. |
| 6,503,973 B2 | 1/2003 | Robert et al. |
| 6,610,261 B1 | 8/2003 | Custodero et al. |
| 6,747,087 B2 | 6/2004 | Custodero et al. |
| 6,774,255 B1 | 8/2004 | Tardivat et al. |
| 6,815,473 B2 | 11/2004 | Robert et al. |
| 6,849,754 B2 | 2/2005 | Deschler et al. |
| 7,199,175 B2 | 4/2007 | Vasseur |
| 7,217,751 B2 | 5/2007 | Durel et al. |
| 7,250,463 B2 | 7/2007 | Durel et al. |
| 7,312,264 B2 | 12/2007 | Gandon-Pain |
| 7,488,768 B2 | 2/2009 | Tardivat et al. |
| 7,820,771 B2 | 10/2010 | Lapra et al. |
| 7,825,183 B2 | 11/2010 | Robert et al. |
| 7,834,074 B2 | 11/2010 | Brunelet et al. |
| 7,882,874 B2 | 2/2011 | Robert et al. |
| 7,900,667 B2 | 3/2011 | Vasseur |
| 8,324,310 B2 | 12/2012 | Robert et al. |
| 8,344,063 B2 | 1/2013 | Marechal et al. |
| 8,455,584 B2 | 6/2013 | Robert et al. |
| 8,461,269 B2 | 6/2013 | Varagniat et al. |
| 8,492,475 B2 | 7/2013 | Araujo Da Silva et al. |
| 8,492,479 B2 | 7/2013 | Robert et al. |

(Continued)

FOREIGN PATENT DOCUMENTS

| | | |
|---|---|---|
| CN | 105358335 A | 2/2016 |
| EP | 1127909 A1 | 8/2001 |

(Continued)

OTHER PUBLICATIONS

English Language Machine Translation of WO 2015198943 (Year: 2015).*
S. Brunauer et al., "Adsorption of Gases in Multimolecular Layers", J. Am. Chem. Soc., vol. 60, pp. 309-319 (1938).
L. Busse et al., "Modelling of Dry and Wet Friction of Silica Filled Elastomers on Self-Affine Road Surfaces", Elastomere Friction, LNACM 51, pp. 1-26 (2010).
International Search Report dated Feb. 1, 2018, in corresponding PCT/FR2017/053149 (4 pages).

*Primary Examiner* — Angela C Scott
(74) *Attorney, Agent, or Firm* — Venable LLP

(57) ABSTRACT

A tire has an outer sidewall, said outer sidewall comprising a rubber composition based on at least one or more diene elastomers, an anti-ozone wax in a content of greater than 8 phr, a reinforcing filler in a content of between 30 and 75 phr, a plasticizer that is liquid at 23° C. in a content of between 5 and 40 phr, and a crosslinking system. This composition has the advantage of being highly resistant to external physical attacks.

4 Claims, 1 Drawing Sheet

(56) References Cited

U.S. PATENT DOCUMENTS

| | | |
|---|---|---|
| 8,883,929 B2 | 11/2014 | Gandon-Pain et al. |
| 8,957,155 B2 | 2/2015 | Seeboth et al. |
| 9,010,393 B2 | 4/2015 | Araujo Da Silva et al. |
| 9,593,233 B2 | 3/2017 | Busch et al. |
| 2001/0036991 A1 | 11/2001 | Robert et al. |
| 2002/0183436 A1 | 12/2002 | Robert et al. |
| 2003/0212185 A1 | 11/2003 | Vasseur |
| 2004/0051210 A1 | 3/2004 | Tardivat et al. |
| 2004/0132880 A1 | 7/2004 | Durel et al. |
| 2005/0004297 A1 | 1/2005 | Durel et al. |
| 2006/0089445 A1 | 4/2006 | Gandon-Pain |
| 2007/0112120 A1 | 5/2007 | Vasseur |
| 2008/0009564 A1 | 1/2008 | Robert et al. |
| 2008/0053588 A1 | 3/2008 | Tsuruta |
| 2008/0132644 A1 | 6/2008 | Lapra et al. |
| 2008/0156404 A1 | 7/2008 | Brunelet et al. |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2009/0270558 A1 | 10/2009 | Gandon-Pain et al. |
| 2009/0292063 A1 | 11/2009 | Robert et al. |
| 2010/0022714 A1 | 1/2010 | Varagniat et al. |
| 2010/0145089 A1 | 6/2010 | Mignani et al. |
| 2010/0184912 A1 | 7/2010 | Marechal et al. |
| 2010/0204359 A1 | 8/2010 | Robert et al. |
| 2010/0249270 A1 | 9/2010 | Robert et al. |
| 2010/0252156 A1 | 10/2010 | Robert et al. |
| 2011/0021702 A1 | 1/2011 | Gandon-Pain et al. |
| 2011/0152458 A1 | 6/2011 | Araujo Da Silva et al. |
| 2011/0294953 A1 | 12/2011 | Seeboth et al. |
| 2012/0208948 A1 | 8/2012 | Gandon-Pain et al. |
| 2013/0312890 A1 | 11/2013 | Iwata et al. |
| 2014/0299249 A1* | 10/2014 | Custodero ................ C08K 3/04 152/525 |
| 2016/0108212 A1* | 4/2016 | Busch ....................... C08L 7/00 524/526 |
| 2016/0152805 A1 | 6/2016 | Jasiunas et al. |
| 2017/0313131 A1 | 11/2017 | Vacherand et al. |

FOREIGN PATENT DOCUMENTS

| | | | |
|---|---|---|---|
| EP | 1270273 A1 | 1/2003 | |
| EP | 1 894 747 A2 | 3/2008 | |
| EP | 2 674 305 A1 | 12/2013 | |
| FR | 1502689 A | 11/1967 | |
| FR | 2740778 A1 | 5/1997 | |
| FR | 2765882 A1 | 1/1999 | |
| WO | 97/36724 A2 | 10/1997 | |
| WO | 99/09036 A1 | 2/1999 | |
| WO | 99/16600 A1 | 4/1999 | |
| WO | 01/92402 A1 | 12/2001 | |
| WO | 02/10269 A2 | 2/2002 | |
| WO | 02/30939 A1 | 4/2002 | |
| WO | 02/31041 A1 | 4/2002 | |
| WO | 02/083782 A1 | 10/2002 | |
| WO | 03/016387 A1 | 2/2003 | |
| WO | 2004/096865 A1 | 11/2004 | |
| WO | 2005/087859 A1 | 9/2005 | |
| WO | 2006/023815 A1 | 3/2006 | |
| WO | 2006/061064 A1 | 6/2006 | |
| WO | 2006/069792 A1 | 7/2006 | |
| WO | 2006/069793 A1 | 7/2006 | |
| WO | 2006/125532 A1 | 11/2006 | |
| WO | 2006/125533 A1 | 11/2006 | |
| WO | 2006/125534 A1 | 11/2006 | |
| WO | 2007/017060 A1 | 2/2007 | |
| WO | 2007/061550 A1 | 5/2007 | |
| WO | 2007/098080 A2 | 8/2007 | |
| WO | 2008/003434 A1 | 1/2008 | |
| WO | 2008/003435 A1 | 1/2008 | |
| WO | 2008/055986 A1 | 5/2008 | |
| WO | 2008/141702 A1 | 11/2008 | |
| WO | 2009/000750 A1 | 12/2008 | |
| WO | 2009000752 A1 | 12/2008 | |
| WO | 2010/072685 A1 | 7/2010 | |
| WO | 2015/000631 A1 | 1/2015 | |
| WO | WO-2015198943 A1 * | 12/2015 | ................ C08L 9/00 |
| WO | 2016/083367 A1 | 6/2016 | |

* cited by examiner

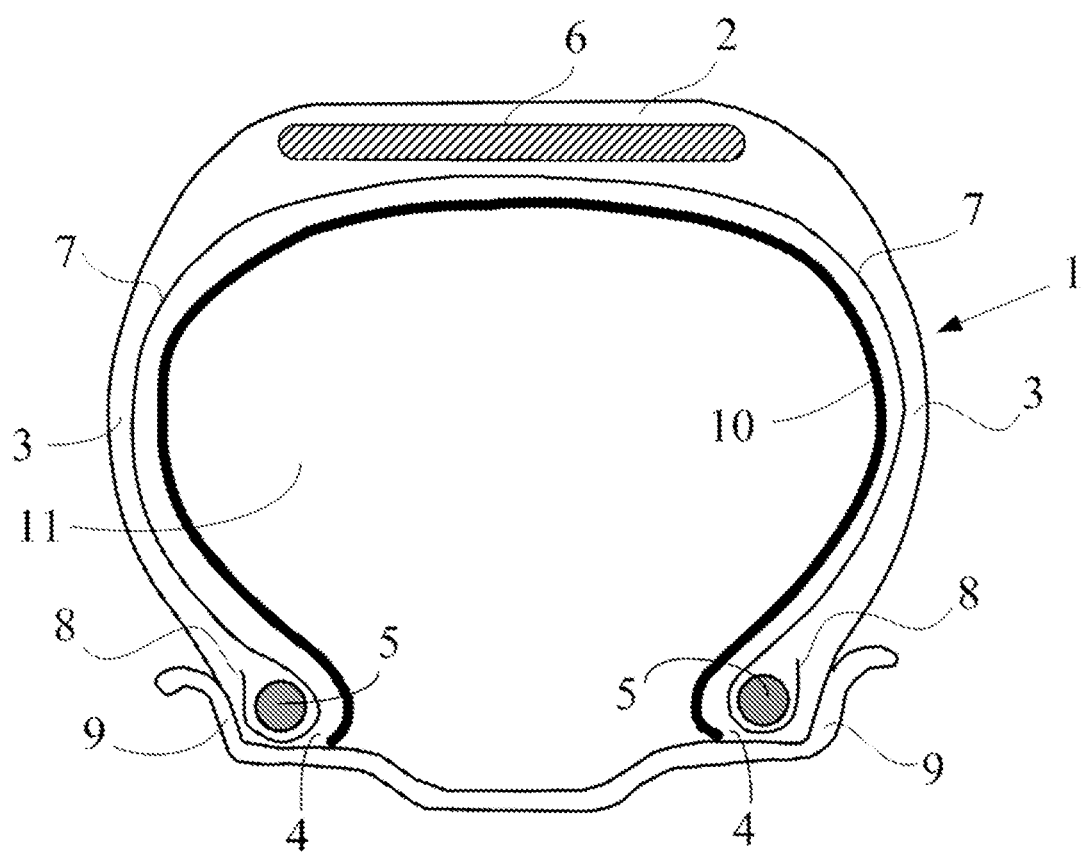

TIRE WITH AN OUTER SIDEWALL COMPOSED OF AT LEAST A DIENE ELASTOMER AND WAX MIXTURE

The present invention relates to tyres and more particularly to the outer sidewalls of tyres.

It is possible to define, within the tyre, three types of regions:

The radially exterior region in contact with the ambient air, this region essentially consisting of the tread and of the outer sidewall of the tyre. An outer sidewall is an elastomeric layer positioned outside the carcass reinforcement with respect to the internal cavity of the tyre, between the crown and the bead, so as to completely or partially cover the region of the carcass reinforcement extending from the crown to the bead.

The radially interior region in contact with the inflation gas, this region generally consisting of the layer airtight to the inflation gas, sometimes referred to as the inner liner.

The inner region of the tyre, that is to say that between the exterior and interior regions. This region includes layers or plies which are referred to here as inner layers of the tyre. These are, for example, carcass plies, tread underlayers, tyre belt plies or any other layer which is not in contact with the ambient air or the inflation gas of the tyre.

The outer sidewall can, depending on the requirements, comprise one or more protective plies, located on the outside with respect to the carcass reinforcement, the role of which protective plies is to protect the rest of the structure of the sidewall from external physical attacks: impacts, tears or other perforations.

This is, for example, the case in the sidewalls of certain tyres intended for rolling over relatively rough ground, aggressive to the sidewalls, for example on rally-type passenger vehicles or else on industrial off-road vehicles of the construction site type.

These protective plies must be sufficiently flexible and deformable so as, on the one hand, to follow as closely as possible the shape of the obstacle on which the sidewall is liable to bear during rolling and, on the other hand, to prevent the possible penetration of foreign bodies towards the inside of said sidewall. To meet such criteria generally requires the use, in these protective plies or layers, of reinforcing threads in the form of elastic metal-strand cords combining a high elasticity and a high breaking energy.

Such metallic protective plies for tyre sidewalls are well known; they have been described, for example, in documents FR 1 502 689 and EP 1 270 273.

However, they exhibit a certain number of disadvantages. Besides the fact that they make the sidewalls of the tyres significantly heavier, they are formed from strand cords which are relatively expensive, on two accounts: first, they are prepared in two stages, namely by prior manufacture of the strands, followed by assembling these strands by twisting; secondly, they generally require a high twist of their wires (i.e., very short helical pitches), a twist which is admittedly essential in order to confer on them the desired elasticity but which involves reduced manufacturing rates. This disadvantage, of course, has repercussions for the cost of the tyres themselves.

Consequently, such modifications to the outer sidewall are not applicable to tyres intended for passenger vehicles, coaches or buses.

There thus still exists a real need to develop a tyre outer sidewall which is more resistant to external physical attacks without, however, significantly increasing its weight. This need is even greater for tyres intended for vehicles, coaches or buses which have to drive along roads which are poorly maintained, degraded, or even obstructed with various objects which may damage the sidewalls.

In order to solve the abovementioned problem, document WO 2016/083367 proposes incorporating, into the outer sidewall composition elastomeric matrix, at least one polymer which is incompatible with the elastomeric matrix and which has a glass transition temperature different from that of the elastomeric matrix. However, this solution can prove to be expensive.

Thus, it still remains advantageous to have tyres which comprise outer sidewalls that are resistant to external physical attacks such as scrapes against a pavement, strikes by stones or objects capable of damaging the sidewalls, impacts, tearing or other perforations, passing over potholes, etc., capable of greatly damaging, or even perforating the tyre, while reducing manufacturing costs.

Surprisingly, the applicant has discovered that the incorporation of an amount of anti-ozone wax greater than 8 phr into a specific tyre outer sidewall composition makes it possible to decrease the coefficient of friction of the outer sidewall and thus to improve its resistance to external physical attacks. Moreover, this anti-ozone wax is less expensive than most of the prior art solutions. Moreover, in addition to the abovementioned properties, the applicant has noted an improvement in the mechanical properties, in particular cohesion properties, of the outer sidewall compositions in accordance with the present invention.

A subject of the invention is thus a tyre having an outer sidewall, said outer sidewall comprising a rubber composition based on at least one or more diene elastomers, an anti-ozone wax in a content of greater than 8 phr, a reinforcing filler in a content of between 30 to 75 phr, a plasticizer that is liquid at 23° C. in a content of between 5 to 40 phr, and a crosslinking system.

BRIEF DESCRIPTION OF THE FIGURES

The invention and its advantages will be easily understood in the light of the description and of the exemplary embodiments which follow, and also of the single appended figure which represents very diagrammatically (without observing a specific scale) a radial section of a pneumatic tyre in accordance with the invention.

Definitions

The expression "part by weight per hundred parts by weight of elastomer" (or phr) should be understood as meaning, within the meaning of the present invention, the part by weight per hundred parts by weight of elastomer or rubber.

In the present document, unless expressly indicated otherwise, all the percentages (%) shown are percentages (%) by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b). In the present document, when an interval of values is denoted by the expression "from a to b", the interval represented by the expression "between a and b" is also and preferentially denoted.

In the present document, the expression composition "based on" is understood to mean a composition comprising the mixture and/or the reaction product of the various constituents used, some of these base constituents being capable of reacting or intended to react with one another, at least in part, during the various phases of manufacture of the composition, in particular during the crosslinking or vulcanization thereof. By way of example, a composition based on an elastomeric matrix and on sulfur comprises the elastomeric matrix and the sulfur before curing, whereas, after curing, the sulfur is no longer detectable as the latter has reacted with the elastomeric matrix with the formation of sulfur (polysulfide, disulfide, monosulfide) bridges.

When reference is made to a "predominant" compound, this is understood to mean, within the meaning of the present invention, that this compound is predominant among the compounds of the same type in the composition, that is to say that it is the one which represents the greatest amount by weight among the compounds of the same type, for example more than 50%, 60%, 70%, 80%, 90%, indeed even 100%, by weight relative to the total weight of the compound type. Thus, for example, a predominant reinforcing filler is the reinforcing filler representing the greatest weight relative to the total weight of the reinforcing fillers in the composition. On the contrary, a "minor" compound is a compound which does not represent the greatest fraction by weight among the compounds of the same type.

Within the context of the invention, the carbon products mentioned in the description may be of fossil or biobased origin. In the latter case, they may partially or completely result from biomass or be obtained from renewable starting materials resulting from biomass. Polymers, plasticizers, fillers, etc., are in particular concerned.

DESCRIPTION OF THE INVENTION

II-1 Diene Elastomer

The outer sidewall composition of the tyre according to the invention comprises one or more diene elastomers.

It is recalled here that elastomer (or "rubber", the two terms being regarded as synonymous) of the "diene" type should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

These diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of alpha-olefins of EPDM type do not come within the preceding definition and can in particular be described as "essentially saturated" diene elastomers (low or very low content, always less than 15%, of units of diene origin). In the category of "essentially unsaturated" diene elastomers, a "highly unsaturated" diene elastomer is understood in particular to mean a diene elastomer having a content of units of diene origin (conjugated dienes) which is greater than 50%.

Given these definitions, diene elastomer capable of being used in the compositions in accordance with the invention is understood more particularly to mean:

a) any homopolymer obtained by polymerization of a conjugated diene monomer having from 4 to 12 carbon atoms;
b) any copolymer obtained by copolymerization of one or more conjugated dienes with one another or with one or more vinylaromatic compounds having from 8 to 20 carbon atoms;
c) a ternary copolymer obtained by copolymerization of ethylene and of an a-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, especially, 1,4-hexadiene, ethylidenenorbornene or dicyclopentadiene;
d) a copolymer of isobutene and of isoprene (butyl rubber) and also the halogenated versions, in particular chlorinated or brominated versions, of this type of copolymer.

Although it applies to any type of diene elastomer, those skilled in the art of tyres will understand that the present invention is preferably employed with essentially unsaturated diene elastomers, in particular of the type (a) or (b) above.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. Mention may be made, for example, for coupling to carbon black, of functional groups comprising a C—Sn bond or aminated functional groups, such as aminobenzophenone, for example; mention may be made, for example, for coupling to a reinforcing inorganic filler, such as silica, of silanol or polysiloxane functional groups having a silanol end (such as described, for example, in FR 2 740 778 or U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973, WO 2009/000750 and WO 2009/000752). Mention may also be made, as other examples of functionalized elastomers, of elastomers (such as SBR, BR, NR or IR) of the epoxidized type.

To summarize, the diene elastomer of the composition can be selected, for example, from the group of highly unsaturated diene elastomers consisting of polyisoprenes (such as natural rubber (NR) and synthetic polyisoprenes (IRs)), polybutadienes (abbreviated to "BRs"), butadiene copolymers, isoprene copolymers and the mixtures of these elastomers. Such copolymers are more preferentially selected from the group consisting of butadiene/styrene copolymers (SBRs), isoprene/butadiene copolymers (BIRs), isoprene/styrene copolymers (SIRs), isoprene/butadiene/styrene copolymers (SBIRs), butadiene/acrylonitrile copolymers (NBRs), butadiene/styrene/acrylonitrile copolymers (NSBRs) or a mixture of two or more of these compounds.

Advantageously, the composition of the outer sidewall of the tyre according to the invention comprises at least one polyisoprene and a polybutadiene.

The term "polyisoprene" is intended to mean, in a known way, an isoprene homopolymer or copolymer, in other words a diene elastomer selected from the group consisting of natural rubber (NR), which may be plasticized or peptized, synthetic polyisoprenes (IRs), the various isoprene copolymers and the mixtures of these elastomers. Mention will in particular be made, among isoprene copolymers, of isobutene/isoprene (butyl rubber IIR), isoprene/styrene (SIR), isoprene/butadiene (BIR) or isoprene/butadiene/styrene (SBIR) copolymers. Preferably, the polyisoprene is selected from the group consisting of natural rubber, a synthetic polyisoprene and a mixture thereof, more preferably the polyisoprene predominantly, or even exclusively, comprises natural rubber.

Preferably, the polyisoprene comprises a weight content of cis-1,4 bonds of at least 90%, more preferentially of at least 98%, relative to the weight of the polyisoprene.

Preferably, the composition of the outer sidewall of the tyre according to the invention comprises, as diene elastomer, predominantly, more preferably exclusively, a polyisoprene and a polybutadiene.

Preferentially, the content of polyisoprene, preferably natural rubber, is from 20 to 80 phr, more preferentially from 20 to 60 phr, more preferentially from 25 to 55 phr, even more preferentially from 25 to 50 phr and very preferentially from 30 to 45 phr.

Preferentially, the content of polybutadiene is from 20 to 80 phr, more preferentially from 40 to 80 phr, more preferentially from 45 to 75 phr, even more preferentially from 50 to 75 phr and very preferentially from 55 to 70 phr.

The composition may also be used in combination with any type of synthetic elastomer other than a diene elastomer, or even with polymers other than elastomers, for example thermoplastic polymers, it being understood that the elastomeric matrix (including the diene and synthetic elastomers, and the abovementioned polymers) predominantly comprises at least one diene elastomer, preferably predominantly a mixture of at least one polyisoprene and a polybutadiene. Preferably, the rubber composition of the outer sidewall of the tyre according to the invention does not contain thermoplastic elastomer or contains less than 10 phr, preferably less than 5 phr, thereof.

II-2 Anti-ozone Wax

The composition of the outer sidewall of the tyre according to the present invention comprises at least 8 phr of anti-ozone wax, well known to those skilled in the art.

The anti-ozone wax that can be used in the context of the present invention can be, in particular, a natural wax, a synthetic wax or a mixture of natural wax and synthetic wax. For example, the anti-ozone wax can be a natural wax selected from the group consisting of mineral waxes, such as paraffin waxes, plant waxes, animal waxes, and mixtures thereof. The anti-ozone wax can also be a synthetic wax selected from the group consisting of Fischer-Tropsch waxes, polyethylene waxes, and mixtures thereof.

Advantageously, the anti-ozone wax is selected from the group consisting of paraffin waxes, Fischer-Tropsch waxes, and mixtures thereof. Preferably, the anti-ozone wax is a paraffin wax or a mixture of paraffin waxes.

Advantageously, the anti-ozone wax predominantly comprises, and advantageously consists of, linear or branched hydrocarbon-based chains of which the number of carbon atoms is within a range extending from 18 to 70, preferably from 18 to 65, more preferably from 18 to 60, preferably from 18 to 55, preferably from 18 to 50, preferably from 22 to 38. Preferably, the hydrocarbon-based chains of the anti-ozone wax are essentially saturated. In the context of the present invention, the term "essentially saturated" is intended to mean a diene unit content of less than 15%, preferably less than 10%, preferably less than 5%, for example 0%.

The ratio of branched (iso)/unbranched (normal) hydrocarbon-based chains in the anti-ozone wax may be within a range extending from 0/100 to 80/20, preferably from 5/95 to 65/35, more preferably from 5/95 to 36/65, even more preferentially from 5/95 to 20/80.

The content of anti-ozone wax may be between 10 to 20 phr, preferably between 10 to 15 phr.

Such anti-ozone waxes are commercially available, for example the Redezon waxes (for example the 500, PWM-80, 7335-G and 7812 series) from the company Repsol, the Varazon waxes (for example the 5998, 4959 to 6810 series) from the company Sasol, the Ozoace 0355 wax from the company Nippon Seiro, and the OK2122 or OK5258H wax from the company Paramelt Co., Ltd.

II-4 Reinforcing Filler

The rubber composition of the outer sidewall of the tyre according to the invention advantageously comprises a reinforcing filler, known for its abilities to reinforce a rubber composition which can be used for the manufacture of tyres.

The reinforcing filler of the rubber composition of the outer sidewall of the tyre according to the invention can comprise carbon black, an organic filler other than carbon black, an inorganic filler or the mixture of at least two of these fillers. Preferably, the reinforcing filler comprises a carbon black, a reinforcing inorganic filler or a mixture thereof. More preferably still, the reinforcing filler predominantly comprises carbon black and, to a minor extent, an inorganic filler. The reinforcing filler may comprise, for example, from 50% to 100% by weight of carbon black, preferably from 55% to 90% by weight, preferably from 60% to 80% by weight. Particularly advantageously, the reinforcing filler comprises exclusively carbon black.

Such a reinforcing filler typically consists of particles, the (weight-)average size of which is less than a micrometre, generally less than 500 nm, most often between 20 to 200 nm, in particular and more preferentially between 20 to 150 nm.

According to the invention, the content of reinforcing filler, preferably the reinforcing filler predominantly comprising carbon black, is between 30 to 75 phr, preferably from 30 to 70 phr, and very preferentially between 30 to 60 phr, preferably between 40 to 60 phr, preferably between 45 to 59 phr, preferably between 50 to 59 phr.

The blacks which can be used in the context of the present invention can be any black conventionally used in tyres or their treads ("tyre-grade" blacks). Among the latter, mention will more particularly be made of the reinforcing carbon blacks of the 100, 200 to 300 series, or the blacks of the 500, 600 or 700 series (ASTM grades), such as, for example, the N115, N134, N234, N326, N330, N339, N347, N375, N550, N683 and N772 blacks. These carbon blacks can be used in the isolated state, as commercially available, or in any other form, for example as support for some of the rubber additives used. The carbon blacks might, for example, be already incorporated in the diene elastomer, in particular isoprene elastomer, in the form of a masterbatch (see, for example, applications WO 97/36724 and WO 99/16600). The BET specific surface area of the carbon blacks is measured according to Standard D6556-10 [multipoint (a minimum of 5 points) method—gas: nitrogen—relative pressure p/p0 range: 0.1 to 0.3].

Mention may be made, as examples of organic fillers other than carbon blacks, of functionalized polyvinyl organic fillers, such as described in applications WO 2006/069792, WO 2006/069793, WO 2008/003434 and WO 2008/003435.

The term "reinforcing inorganic filler" should be understood here as meaning any inorganic or mineral filler, whatever its colour and its origin (natural or synthetic), also known as "white" filler, "clear" filler or even "non-black" filler, in contrast to carbon black, capable of reinforcing, by itself alone, without means other than an intermediate coupling agent, a rubber composition intended for the manufacture of pneumatic tyres, in other words capable of replacing, in its reinforcing role, a conventional tyre-grade carbon black; such a filler is generally characterized, in a known way, by the presence of hydroxyl (—OH) groups at its surface. In other words, without a coupling agent, the inorganic filler does not make it possible to reinforce, or to sufficiently reinforce, the composition and consequently does not come within the definition of "reinforcing inorganic filler".

Mineral fillers of the siliceous type, preferably silica ($SiO_2$), are suitable in particular as reinforcing inorganic fillers. The silica used can be any reinforcing silica known to those skilled in the art, in particular any precipitated or fumed silica exhibiting a BET specific surface and also a CTAB specific surface both of less than 450 $m^2/g$, preferably from 30 to 400 $m^2/g$, in particular between 60 and 300 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 to 8755 silicas from Huber or the silicas with a high specific surface as described in application WO 03/016387.

In the present account, as regards the silica, the BET specific surface is determined in a known way by gas adsorption using the Brunauer-Emmett-Teller method described in *The Journal of the American Chemical Society*, Vol. 60, page 309, February 1938, more specifically according to French Standard NF ISO 9277 of December 1996 (multipoint (5 point) volumetric method—gas: nitrogen—degassing: 1 hour at 160° C.—relative pressure $p/p_0$ range: 0.05 to 0.17). The CTAB specific surface is the outer surface determined according to French Standard NF T 45-007 of November 1987 (method B).

Mineral fillers of the aluminous type, in particular alumina ($Al_2O_3$) or aluminium (oxide) hydroxides, or also reinforcing titanium oxides, for example described in U.S. Pat. Nos. 6,610,261 and 6,747,087, are also suitable as reinforcing inorganic fillers.

The physical state in which the reinforcing inorganic filler is provided is not important, whether it is in the form of a powder, of microbeads, of granules, of beads or any other appropriate densified form. Of course, the term "reinforcing inorganic filler" is also understood to mean mixtures of different reinforcing inorganic fillers, in particular of highly dispersible siliceous and/or aluminous fillers as described above.

Those skilled in the art will understand that, as filler equivalent to the reinforcing inorganic filler described in the present section, a reinforcing filler of another nature, in particular organic nature, might be used provided that this reinforcing filler is covered with an inorganic layer, such as silica, or else comprises functional sites, in particular hydroxyl sites, at its surface requiring the use of a coupling agent in order to form the bond between the filler and the elastomer.

In order to couple the reinforcing inorganic filler to the diene elastomer, use is made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional.

Those skilled in the art can find coupling agent examples in the following documents: WO 02/083782, WO 02/30939, WO 02/31041, WO 2007/061550, WO 2006/125532, WO 2006/125533, WO 2006/125534, U.S. Pat. No. 6,849,754, WO 99/09036, WO 2006/023815, WO 2007/098080, WO 2010/072685 and WO 2008/055986.

The content of coupling agent is advantageously less than 10 phr, it being understood that it is generally desirable to use as little as possible of it. Typically, when a reinforcing inorganic filler is present, the content of coupling agent represents from 0.5% to 15% by weight, relative to the amount of inorganic filler. Its content is preferably within a range extending from 0.5 to 7.5 phr. This content is easily adjusted by those skilled in the art depending on the content of inorganic filler used in the composition.

The rubber composition of the outer sidewall of the tyre in accordance with the invention can also comprise, in addition to the coupling agents, coupling activators, agents for covering the inorganic fillers or more generally processing aids capable, in a known way, by virtue of an improvement in the dispersion of the filler in the rubber matrix and of a lowering in the viscosity of the compositions, of improving their ease of processing in the raw state, these processing aids being, for example, hydrolysable silanes, such as alkylalkoxysilanes (in particular alkyltriethoxysilanes), polyols, polyethers (for example, polyethylene glycols), primary, secondary or tertiary amines (for example, trialkanolamines), hydroxylated or hydrolysable POSs, for example α,ω-dihydroxypolyorganosiloxanes (in particular α,ω-dihydroxypolydimethylsiloxanes), or fatty acids, such as, for example, stearic acid.

II-5 Liquid Plasticizer

The composition of the outer sidewall of the tyre according to the invention also comprises one or more (that is to say at least one) plasticizer(s) that is (are) liquid at 23° C., in a content of between 5 and 40 phr.

A plasticizer that is liquid at 23° C. has the function of softening the matrix by diluting the elastomer and the reinforcing filler; its Tg is preferably less than −20° C., more preferably less than −40° C.

Any extender oil, whether of aromatic or non-aromatic nature, or any liquid plasticizing agent known for its plasticizing properties with regard to diene elastomers can be used. At ambient temperature (23° C.), these plasticizers or these oils, which are more or less viscous, are liquids (that is to say, as a reminder, substances which have the ability to eventually take on the shape of their container), as opposed, in particular, to plasticizing hydrocarbon resins, which are by nature solids at ambient temperature.

According to the invention, the plasticizer that is liquid at 23° C. can be selected from the group consisting of liquid diene polymers, polyolefin oils, naphthenic oils, paraffinic oils, DAE oils, MES (Medium Extracted Solvates) oils, TDAE (Treated Distillate Aromatic Extracts) oils, RAE (Residual Aromatic Extract oils) oils, TRAE (Treated Residual Aromatic Extract) oils and SRAE (Safety Residual Aromatic Extract oils) oils, mineral oils, liquid plasticizers derived from terpenes, such as the product Dimarone from Yasuhara, vegetable oils, ether plasticizers, such as polyethylene glycols or polypropylene glycols, ester plasticizers, such as triesters of carboxylic acid, of phosphoric acid, of sulfonic acid and the mixtures of these triesters, phosphate plasticizers, sulfonate plasticizers and the mixtures of these liquid plasticizers. Advantageously, the plasticizer that is liquid at 23° C. is selected from the group consisting of MES oils, TDAE oils, naphthenic oils, vegetable oils and the mixtures of these liquid plasticizers.

The liquid polymers resulting from the polymerization of olefins or dienes, such as polybutenes, polydienes, in particular polybutadienes, polyisoprenes (also known under the name LIRs) or copolymers of butadiene and isoprene, or also copolymers of butadiene or isoprene and styrene, or the mixtures of these liquid polymers are also suitable. The number-average molar mass of such liquid polymers is preferably within a range extending from 500 g/mol to 50 000 g/mol, preferably from 1000 g/mol to 10 000 g/mol. Mention may be made, by way of example, of the Ricon products from Sartomer.

Advantageously, the liquid plasticizer is selected from the group consisting of MES oils, TDAE oils and vegetable oils. Mention may be made, as an example of vegetable oil, for example, of oleic sunflower oil.

Advantageously, the content of liquid plasticizer in the composition can be within a range extending from 6 to 30 phr, preferably from 10 to 25 phr, more preferably from 15 to 25 phr.

II-6 Crosslinking System

The crosslinking system can be composed of any crosslinking agent capable of crosslinking or bringing about the crosslinking of the diene elastomer of the composition. Preferably, the crosslinking system comprises sulfur as crosslinking agent; it is thus a vulcanization system.

The vulcanization system proper is based on sulfur (or on a sulfur-donating agent) and on a primary vulcanization accelerator. Various known secondary vulcanization accelerators or vulcanization activators, such as zinc oxide, stearic acid or equivalent compounds, or guanidine derivatives (in particular diphenylguanidine), are added to this base vulcanization system, being incorporated during the non-productive first phase and/or during the productive phase, as described subsequently.

The sulfur is used at a preferred content of between 0.5 to 10 phr, more preferably of between 0.5 to 5 phr, in particular between 0.5 to 3 phr, when the composition of the invention is intended, according to a preferred form of the invention, to constitute a tyre tread.

The vulcanization system of the composition according to the invention can also comprise one or more additional accelerators, for example compounds of the family of the thiurams, zinc dithiocarbamate derivatives, sulfenamides, guanidines or thiophosphates. Use may be made in particular of any compound capable of acting as accelerator of the vulcanization of diene elastomers in the presence of sulfur, especially accelerators of thiazole type and also derivatives thereof, accelerators of the thiuram type, and zinc dithiocarbamates. These accelerators are more preferentially selected from the group consisting of 2-mercaptobenzothiazole disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenimide (abbreviated to "TBSI"), zinc dibenzyldithiocarbamate (abbreviated to "ZBEC") and the mixtures of these compounds. Preferably, use is made of a primary accelerator of the sulfenamide type.

II-7 Various Additives

The rubber composition of the outer sidewall of the tyre according to the invention may also comprise all or some of the usual additives normally used in tyre outer sidewall elastomer compositions, for instance fillers other than those mentioned above, for example lamellar fillers, hydrocarbon-based plasticizing resins having a high Tg, preferably greater than 30° C., as described for example in applications WO 2005/087859, WO 2006/061064 and WO 2007/017060, pigments, protective agents such as anti-ozone waxes, chemical anti-ozonants, antioxidants, anti-fatigue agents, reinforcing resins (such as resorcinol or bismaleimide), methylene acceptors (for example novolac phenolic resin) or methylene donors (for example HMT or H3M) as described for example in application WO 02/10269.

TYRES AND BRIEF DESCRIPTION OF THE SINGLE FIGURE

FIG. 1 represents very diagrammatically a radial cross section of a pneumatic tyre in accordance with the invention.

The present invention can be applied to any type of tyre. The tyre according to the invention can be intended to equip motor vehicles of passenger vehicle type, SUVs ("Sport Utility Vehicles"), or two-wheel vehicles (in particular motorcycles), or aircraft, or also industrial vehicles selected from vans, heavy-duty vehicles—that is to say, underground trains, buses, heavy road transport vehicles (lorries, tractors, trailers) or off-road vehicles, such as heavy agricultural vehicles or civil engineering vehicles—, and others. The outer sidewall in accordance with the invention is however particularly suitable for pneumatic tyres of passenger vehicles or industrial vehicles such as heavy goods vehicles.

By way of example, the single appended figure represents very diagrammatically (without observing a specific scale) a radial section of a pneumatic tyre in accordance with the invention.

This pneumatic tyre 1 comprises a crown 2 reinforced by a crown reinforcement or belt 6, two outer sidewalls 3 and two beads 4, each of these beads 4 being reinforced with a bead wire 5. The crown 2 is surmounted by a tread, not represented in this schematic figure. A carcass reinforcement 7 is wound around the two bead wires 5 in each bead 4, the turn-up 8 of this reinforcement 7 being, for example, positioned towards the outside of the tyre 1, which is represented here fitted onto its wheel rim 9. The carcass reinforcement 7 is, in a way known per se, formed of at least one ply reinforced by "radial" cords, for example made of textile or metal, that is to say that these cords are positioned virtually parallel to one another and extend from one bead to the other so as to form an angle of between 80° and 90° with the median circumferential plane (plane perpendicular to the axis of rotation of the tyre which is located midway between the two beads 4 and passes through the middle of the crown reinforcement 6).

The inner wall of the pneumatic tyre 1 comprises an airtight layer 10, for example with a thickness equal to approximately 0.9 mm, on the side of the internal cavity 11 of the pneumatic tyre 1.

The tyre according to the invention may be a pneumatic tyre as described above in which the outer sidewall comprises a composition as defined in the present description.

The tyre provided with its outer sidewall as described above is preferably produced before vulcanization (or curing). The vulcanization is subsequently performed conventionally. The block elastomers withstand well the stresses related to the vulcanization stage.

An alternative manufacturing form which is advantageous, for those skilled in the art of pneumatic tyres, will consist, for example during a first stage, in depositing the airtight layer flat directly on a tyre-building drum, in the form of a skim of suitable thickness, before covering the latter with the remainder of the structure of the pneumatic tyre, according to manufacturing techniques well known to those skilled in the art.

EXAMPLES

III-1 Measurements and Tests Used

Method for Measuring the Coefficient of Friction ($\mu$)

The measurements of coefficient of dynamic friction were carried out according to a method identical to that described by L. Busse, A. Le Gai and M. Kuppel (Modelling of Dry and Wet Friction of Silica Filled Elastomers on Self-Affine Road Surfaces, Elastomer Friction, 2010, 51, p. 8) on a Brucker UMT3 tribometer. The test specimens are produced by moulding and then crosslinking a rubber support in the shape of a ring with an external diameter of 7 cm, an internal diameter of 6 cm and a thickness of 0.7 cm. After closing the mould, the latter is placed in a press comprising heating platens at the temperature (typically 150 deg. C.) necessary and for the time necessary for the crosslinking of the material (typically several tens of minutes), at a pressure of 16 bar. The ground used to carry out these measurements is a set of 8 steel polars 19 mm in diameter, with a hemispherical head having a radius of 9.5 mm and a height of 20 mm. The friction was performed under dry conditions. The test specimen is subjected to a sliding movement in translation parallel to the plane of the ground. The sliding velocity SV is set at 0.9 m/sec. Measurements were carried out at 25° C. and 60° C. The normal stress applied n is 300 kPa. The tangential stress t, opposed to the movement of the test specimen over the ground, is measured continuously. The ratio of the tangential stress t to the normal stress n gives the coefficient of dynamic friction $\mu$.

Dynamic Properties after Curing (Tensile Test)

These tensile tests make it possible to determine the elasticity stresses and the properties at break. Unless otherwise indicated, they are carried out in accordance with French Standard NF T 46-002 of September 1988. Processing the tensile recordings also makes it possible to plot the curve of modulus as a function of the elongation. The modulus used here is the nominal (or apparent) secant modulus measured in first elongation, calculated by reducing to the initial cross section of the test specimen.

The tests for elongation at break (% EB) and stress at break (SB) are based on the standard NF ISO 37 from December 2005 on a dumbbell-shaped test specimen of H2 type and are measured at a pull speed of 500 mm/min. The elongation at break is expressed as % elongation. The stress at break is expressed in MPa.

The tearability indices are measured on a test specimen pulled at 500 mm/min in order to cause breaking of the test specimen. The force (N/mm) to be exerted in order to obtain breaking is determined and the elongation at break (as %) and the stress at break are measured. The test is carried out on a test specimen 10 mm×145 mm×2.5 mm in size notched at its centre according to its length, to a depth of 5 mm.

All these tensile measurements are carried out under the standard conditions of temperature (23±2° C.) and hygrometry (50 ±5% relative humidity), according to French Standard NF T 40-101 (December 1979).

III-2 Preparation of the Compositions

The tests which follow are carried out in the following way: the diene elastomer, the reinforcing filler and also the various other ingredients, with the exception of the cross-linking system, are successively introduced into a blade mixer (final degree of filling: approximately 70% by volume), the initial vessel temperature of which is approximately 90° C. Thermomechanical working is then carried out (non-productive phase) in one step, which lasts in total approximately from 3 to 4 min, until a maximum "dropping" temperature of 160° C. is reached.

The mixture thus obtained is recovered and cooled and then sulfur and an accelerator of sulfenamide type are incorporated on a mixer (homofinisher) at 40° C., everything being mixed (productive phase) in an open mill for an appropriate time (for example between 5 to 12 min).

The compositions thus obtained are subsequently calendered, either in the form of plaques (thickness of 2 to 3 mm) or of thin sheets of rubber, for the measurement of their physical or mechanical properties, or extruded in the form of a profiled element.

III-3 Tests on Rubber Compositions

The formulation of the compositions I and C is described in Table I. These compositions were prepared in accordance with the process described in point III-2 above.

The coefficients of friction $\mu$ and the dynamic properties of these compositions were measured in accordance with the protocol described in point III-1 above. The results obtained are presented in Table II. The lower the coefficient of friction, the more resistant the composition is to external attacks. Moreover, the higher the elongation at break, the stress at break or the tearability, the better the cohesion properties of the composition.

TABLE I

| Ingredients | C | I |
| --- | --- | --- |
| Natural rubber | 50 | 50 |
| Butadiene rubber[1] | 50 | 50 |
| Carbon black[2] | 56 | 56 |
| Plasticizer[3] | 22 | 22 |
| Anti-ozone wax[4] | 1 | 10 |
| TMQ[5] | 1 | 1 |
| 6PPD[6] | 3 | 3 |
| Stearic acid | 1 | 1 |
| ZnO | 2.5 | 2.5 |
| CBS[7] | 1 | 1 |
| Sulfur Sol 2H | 1.5 | 1.5 |

[1]BR with 0.5% of 1,2-; 1 to 1.5% of trans; >98% of cis-1,4-(Tg = −108° C.);
[2]Carbon black N330 from the company Cabot
[3]MES oil, Catenex SNR, from the company Shell
[4]Redezon 500 wax from the company Repsol
[5]2,2,4-trimethyl-1,2-dihydroquinoline, Vulkanox HS, from the company Lanxess
[6]N-(1,3-Dimethylbutyl)-N'-phenyl-p-phenylenediamine, 6-PPD, from the company Flexsys
[7]N-Cyclohexyl-2-benzothiazolesulfenamide, Santocure CBS, from the company Flexsys

TABLE II

| Measurement | C | I |
|---|---|---|
| μ max at 25° C. | 0.99 | 0.82 |
| μ mean at 25° C. | 0.71 | 0.59 |
| μ max at 60° C. | 0.92 | 0.78 |
| μ mean at 60° C. | 0.60 | 0.58 |
| % EB at 23° C. | 600 | 650 |
| SB at 23° C. (MPa) | 17 | 16 |
| Tearability % EB at 23° C. | 350 | 350 |
| Tearability SB at 23° C. (MPa) | 43 | 50 |

These results show a very large decrease in the coefficient of friction μ of the compositions in accordance with the invention. Thus, the present invention makes it possible to significantly improve the lifetime of tyres, since said tyres become much less sensitive to external attacks.

Moreover, the results relating to the elongation at break and the stress at break, with or without initiator (notches) demonstrate an improvement in the properties of cohesion and fatigue resistance of the compositions in accordance with the invention.

The invention claimed is:

1. A tire having an outer sidewall, said outer sidewall comprising a rubber composition based on at least:
  a polyisoprene in a content from 25 to 55 phr and a polybutadiene in a content from 45 to 75 phr;
  an anti-ozone wax in a content from 10 to 15 phr, wherein the anti-ozone wax is a paraffin wax which predominantly comprises branched hydrocarbon-based chains;
  a reinforcing filler in a content from 50 to 56 phr, wherein the reinforcing filler is carbon black;
  a plasticizer that is liquid at 23° C. in a content from 15 to 25 phr, wherein the plasticizer is an MES oil; and
  a crosslinking system.

2. The tire according to claim 1, wherein the polyisoprene predominantly comprises natural rubber.

3. The tire according to claim 1, wherein the anti-ozone wax predominantly comprises branched hydrocarbon-based chains of which the number of carbon atoms is within a range extending from 18 to 70.

4. The tire according to claim 1, wherein a ratio of branched (iso) /unbranched (normal) hydrocarbon-based chains in the anti-ozone wax is within a range extending from 65/35 to 80/20.

* * * * *